Figure 3:
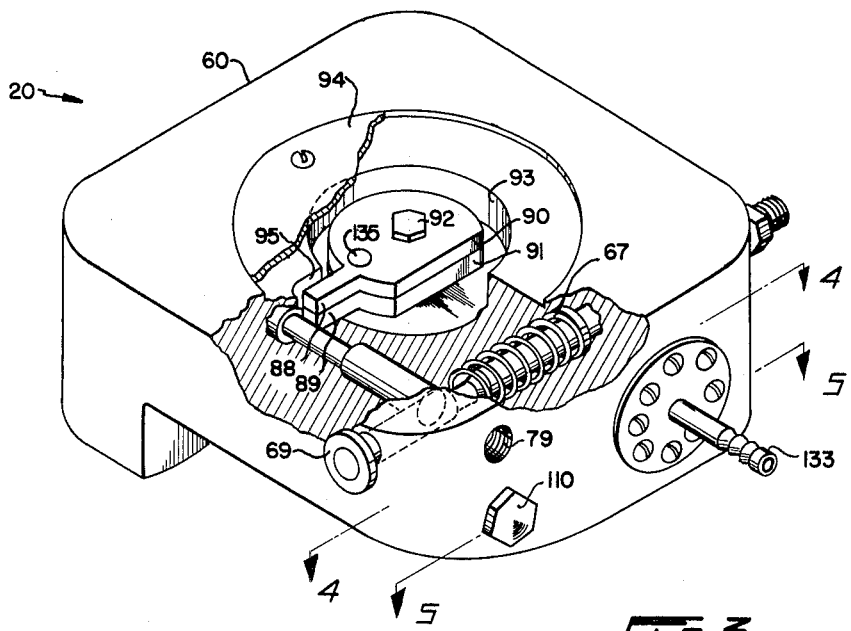

Feb. 15, 1966    L. H. JORDAN ETAL    3,235,684
TIRE PRESSURE DROP SIGNALLING APPARATUS
Filed Dec. 13, 1963    2 Sheets-Sheet 1

INVENTORS
LESLIE H. JORDAN
JOHN ARDEN
BY
Fetherstonhaugh & Co.
ATTORNEYS

Feb. 15, 1966   L. H. JORDAN ETAL   3,235,684
TIRE PRESSURE DROP SIGNALLING APPARATUS
Filed Dec. 13, 1963
2 Sheets-Sheet 2

INVENTORS
LESLIE H. JORDAN
JOHN ARDEN
BY
Featherstonhaugh & Co.
ATTORNEYS

United States Patent Office 3,235,684
Patented Feb. 15, 1966

3,235,684
TIRE PRESSURE DROP SIGNALLING APPARATUS
Leslie H. Jordan, 2021 Broadway E., Vancouver, British Columbia, Canada, and John Arden, 6049 Portland St., Burnaby, British Columbia, Canada
Filed Dec. 13, 1963, Ser. No. 330,401
15 Claims. (Cl. 200—61.25)

This invention relates to apparatus for signalling pressure drops in pneumatic tires of vehicles.

Although this apparatus may be used with a single pneumatic tire on a wheel, it is primarily designed for dual wheel tires. The apparatus provides a signal, which may be visual and/or audible in a vehicle when a tire thereof loses pressure to the point where it is dangerous for travelling on a highway and also dangerous to the construction of the tire itself. This apparatus is useful for signalling a pressure drop in a single tire so that a person has time to get to the side of the road or highway while there is still air in the tire, or the driver is warned that a tire is under-inflated so that he will not drive too far on it to the detriment of the tire construction. However, the most important place for this apparatus is in vehicles having dual wheels. If one tire of a dual wheel goes flat, the other tire holds up the load so that the driver has no indication of the flat tire. At this time the good tire is overloaded, and if the vehicle is travelling at high speed, the soft tire flexes around and rubs against the good tire until the friction starts a fire. Even then, the trouble is not usually noticed by the driver for some time, and this frequently results in the loss of both tires.

Efforts have been made in the past to provide apparatus that may be mounted on a vehicle to create a signal when a tire thereof deflates below a predetermined level. The efforts of the past have not been successful as is evidenced by the fact that none is in general use today. Part of the difficulty is caused by the fact that the tire is on a rotating wheel, and it is necessary to use electrical circuits extending from the rotating wheel to stationary parts of the vehicle. The apparatus involved has obviously not been very practical or reliable. One form of apparatus designed in the past to overcome these problems includes an air pressure-operated mechanism mounted on the outer surface of the brake drum of the wheel for operating an arm which projects into the drum and is moved when the pressure in the tire drops below a predetermined level into the path of an actuating arm of a switch mounted with the drum. The air-operated mechanism is comparatively delicate, and it is believed that the prior aparatus failed because it was not able to stand up to the pounding which it would receive during the operation of the vehicle. In addition to this, in order to install the apparatus, it was necessary to remove the brake drums from the wheels, drill the drums, mount the apparatus on the surfaces thereof, and to mount the switch within the drum itself.

The present invention overcomes these difficulties by providing a unit which may be mounted anywhere on the outer surface of a wheel, and preferably on the axle hub cap where it does not affect the balance of the wheel. A simple operating wire preferably in the form of a Bowden cable, extends from this unit through the wheel or wheels and over the outer annular surface of the adjacent brake drum, to which it may be anchored. An operating finger or reed or an electric switch with a projecting operating finger or arm, is mounted on a stationary portion of the vehicle near the brake drum. The operating wire is clear of the reed, finger or operating arm when the pressure in the tire or tires is above a predetermined level. However, if the pressure in a tire drops below this level, the mechanism operates to shft the wire outwardly into line with the reed, finger or arm so that it contacts the reed or finger once during each revolution of the wheel, or contacts the arm to operate the switch thereof. Signal means, visual and/or audible is mounted near the driver's seat in the vehicle, and is operated when said wire is shifted outwardly to engage the reed, finger or arm. It will be noted that this apparatus can be mounted on the wheel without removing it from the vehicle and without any drilling operation behind the wheel or around the brake drum. In addition to this, the unit is so constructed that it will function properly regardless of how it is vibrated or shaken by the wheel. All the moving parts are completely encased and well supported so that they are not affected by vibration. The unit may be made for one tire, or it may be made for two tires without the necessity of duplicating all the operating parts.

Figure 2:
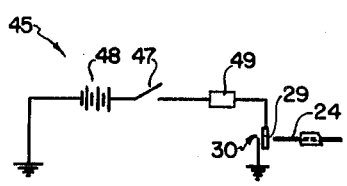
Figure 1:
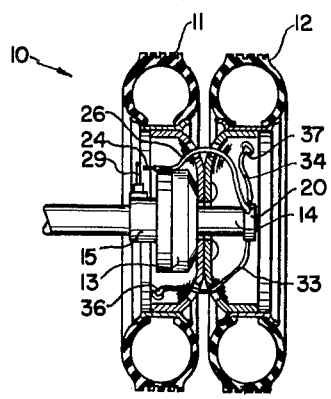

A preferred form of the invention is illustrated by way of example in the accompanying drawings, in which, FIGURE 1 diagrammatically illustrates a dual wheel having the pressure drop signalling apparatus mounted thereon, FIGURE 2 is a wiring diagram of a simple electrical system incorprating this apparatus.

Figure 8:
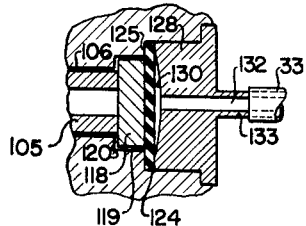
Figure 4:
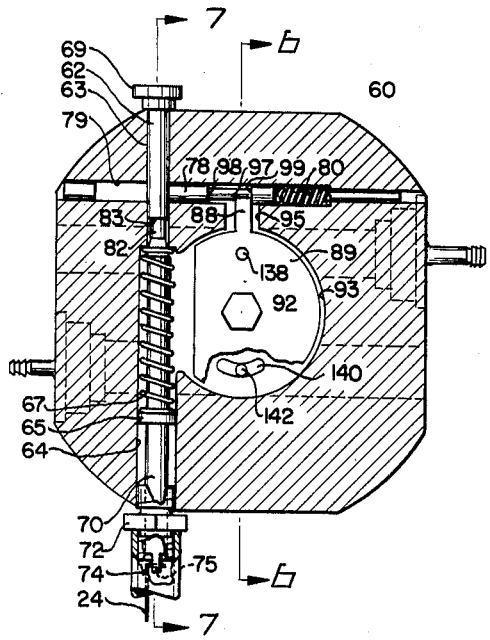
Figure 5:
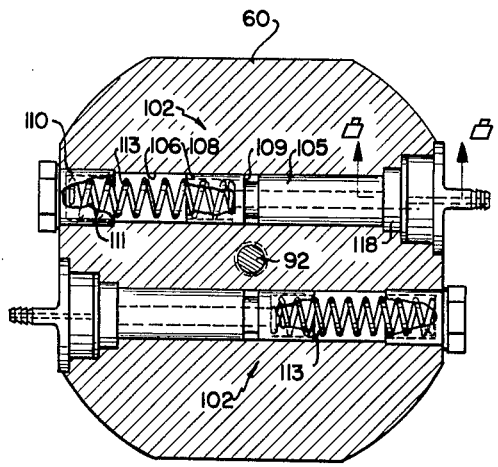
Figure 6:
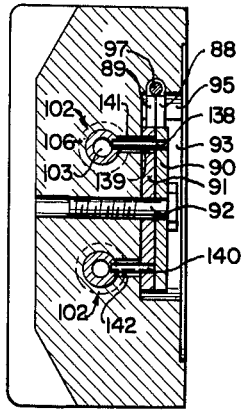
Figure 7:
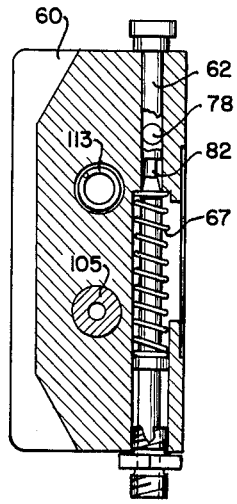

FIGURE 3 is a perspective view, partly in section, of the unit to be munted on a vehicle wheel, FIGURE 4 is a horizontal section taken on the line 4—4 of FIGURE 3, FIGURE 5 is another horizontal section taken on the line 5—5 of FIGURE 3, FIGURE 6 is a cross section taken on the line 6—6 of FIGURE 4, FIGURE 7 is a cross secion taken on the line 7—7 of FIGURE 4, and FIGURE 8 is an enlarged partial section taken on line 8—8 of FIGURE 5.

Referring to FIGURE 1 of the drawings, 10 represents a dual wheel having pneumatic tires 11 and 12 mounted thereon. The brake drum of the wheel is shown at 13, and the axle hub cap thereof at 14. A stationary part of the vehicle, such as an axle housing 15, is located inside the wheel. A unit 20 of the signalling apparatus is mounted on hub 14 in any convenient manner, and an operating wire 24 extends from unit 20 through the wheel and over the outer peripheral surface of drum 13. This wire is preferably part of a Bowden cable which includes a casing 26, said casing being secured to drum 13 in any convenient manner, such as by means of a spot weld.

Operating wire 24 extends inwardly from wheel 10 towards and into line with the operating arm 29 of an electrical switch 30 mounted on a stationary portion of the vehicle, such as housing 15. The signalling apparatus is such that when the pressure in tires 11 and 12 is above a predetermined level, operating wire 24 is clear of switch operating arm 29. However, if the pressure of either tire drops below the predetermined level, unit 20 operates to shift wire 24 outwardly of the wheel into line with arm 29 to move the latter and operate switch 30.

Air tubes 33 and 34 extend from unit 20 to the valve stems 36 and 37 of tires 11 and 12. Tubes 33 and 34 have internally threaded fittings 38 and 39 which are screwed on to stems 36 and 37, said fittings being such that they depress the valves of said stems so that each of the tubes is in direct communication with the interior of the tire to which it is connected.

FIGURE 2 illustrates by way of example an electrical circuit 45 including a main switch 47, battery 48, a signal device 49 and switch 30. Said switch is closed when its operating arm 29 is engaged and moved by wire 24.

FIGURES 3 to 7 illustrate unit 20 in detail. This unit includes a block or casing 60. A bolt 62 is slidably mounted in and extends through block 60. This bolt slidably fits in a bore 63 extending from side to side of the block, said bore having an enlargement 64 in which a collar 65 fixedly secured to the bolt slidably fits. A coil spring 67 surrounds bolt 62 and extends between collar 65 and the end of the enlarged part 64 of the bore. Spring 67 draws the cocking handle 69 on the end of bolt 62 against the adjacent side of block 60. The opposite end 70 of the bolt projects out of the block into an externally threaded fitting 72, and operating wire 24 is connected to this end of the bolt in any desired manner. For example, the end of the wire may be bent over to form a hook 74 which extends through a hole 75 in the adjacent end of the bolt.

A locking pin 78 is slidably mounted in a bore 78 formed in block 60 and which extends substantially at right angles to bore 63. A spring 80 bearing against one end of pin 78 normally presses the opposite end of said pin against bolt 62 when the latter is in the position shown in FIGURE 4. The bolt has a reduced portion 82 therein to form a shoulder 38 which is spaced inwardly from handle 69. When bolt 62 is drawn outwardly of block 60 by means of handle 69 until shoulder 83 clears locking pin 78, the latter moves into the reduced portion 82 of the bolt to engage said shoulder 83 and thereby retain the bolt in a cocked position.

Latch means is provided for normally retaining locking pin 78 out of engagement with bolt 62. This latch means includes two latch fingers 88 and 89 projecting from two discs 90 and 91 independently rotatably mounted on a pin 92 within a circular recess 93 formed in block 60, said recess normally being closed by a cover 94, see FIGURE 3. Fingers 88 and 89 radiate from discs 90 and 91 and extend side by side freely through an enlarged slot 95 extending between recess 93 and bore 80. Fingers 88 and 89 extend into a recess 97 formed in locking pin 78 and having shoulders 98 and 99 at its opposite ends.

Resilient means is provided for normally biasing latch fingers 88 and 89 into positions bearing against shoulder 98 and retaining locking pin 78 clear of bolt 62, at which time said bolt cannot be cocked. As stated above, this apparatus may be used with a single tire wheel or a dual tire wheel. In the first instance there would be only one resilient means 102 in block 60, but in the second instance, there would be two resilient means 102 therein, as shown in FIGURE 5. As the resilient means 102 are identical, only one will be described in detail.

Each resilient means includes a sleeve or plunger rod 105 slidably mounted in a bore 106 formed in block 60 and extending substantially parallel with locking pin bore 79 but spaced inwardly therefrom and in a different plane within the block. Bore 106 opens out at its opposite ends from the block. Sleeve 105 is movable longitudinally of bore 106, and has a cup 108 on its inner end slidably mounted in the bore, said sleeve also having a reduced portion behind cup 108 and forming a notch 109 in said sleeve. A threaded plug 110 is screwed into an end of bore 106 and has a cup 111 at the inner end thereof facing cup 108, and a coil spring 113 extends between these cups and has its opposite ends fitting therein. The tension of spring 113 may be adjusted by screwing plug 110 inwardly or outwardly relative to bore 106.

The outer end of sleeve 105 bears against a disc 118 mounted in a recess 119 which is of larger diameter than bore 106, forming a shoulder 120 therebetween. Disc 118 is able to move back and forth a little in recess 119 in an axial direction relative to bore 106. A resilient diaphragm 124 is held against a shoulder 125 by a plug 128, said plug having an inner face opposed to diaphragm 124 with a circular indentation 130 therein. A small air passage 132 extends through plug 128, and a stem 133 projecting outwardly from said plug over which air tube 33 or 34 is fitted when the apparatus is in operation.

A transfer pin 138 is secured to and extends downwardly from disc 90 through a slot 139 in disc 91, see FIGURE 6 and into notch 109 of sleeve 105 of one resilient means 102. A second transfer pin 140 extends downwardly from disc 91 into notch 109 of sleeve 105 of the other resilient means 102. Pins 138 and 140 extend downwardly through arcuate slots 141 and 142 formed in block 60 at the bottom of recess 91 and over the notches 109 of the adjacent sleeves 105. When the apparatus is not in operation, springs 113 press cups 108 against transfer pins 138 to turn disc 89 so that fingers, 88 and 89 retain latch pin 78 clear of bolt 62. However, when tubes 33 and 34 are fitted to stems 133, the pressure of the air in tires 11 and 12 is directed against the two diaphragms 124. The diaphragms, in turn, bear against discs 118 which move sleeves 105 inwardly of block 60. This causes sleeves 105 to engage transfer pins 138 and 140 and rotate discs 91 and 92 to swing latch fingers 88 and 89 so that spring 80 is free to urge locking pin 78 against bolt 62. If this bolt is drawn outwardly by means of handle 69 at this time, it is retained in the cocked position when shoulder 83 is engaged by locking pin 78.

The operation of this signalling apparatus is very simple. After tires 11 and 12 have been inflated to the desired pressure, tubes 33 and 34 are connected to the stems 36 and 37 thereof by fittings 38 and 39. This applies the pressure of the air in the tires against the two diaphragms 124 in block 60 of unit 20. Bolt 62 may now be cocked by drawing it outwardly be means of handle 69. The pressure of the air of the two tires against the two diaphragms 124 is sufficient to overbalance the pressure of springs 113 so that as long as the pressure in both tires remains above a predetermined level, bolt 62 remains cocked. At this time, operating wire 24 which is connected to said bolt is drawn out of the path of switch operating arm 29 so that no signal is given in the vehicle during rotation of the dual wheel 10. The desired level of pressure of the tires at which a signal is given is adjusted by turning plugs 110 to increase or decrease the pressure of springs 113.

If the pressure of either tire 11 or 12 drops below the predetermined level the balance of the latch means is upset, and spring 113 of the resilient means 102 to which the air tube of said tire is attached, acts against transfer pin 138 or 140 to turn disc 90 or 91 and cause latch finger 88 or 89 to withdraw locking pin 78 from shoulder 83 of bolt 62. Spring 67 now reasserts itself to move bolt 62 into block 60, and this action moves operating wire 24 outwardly relative to the block and therefore shifts its outer or free end into the path of switch arm 29 to operate switch 30 and close circuit 45 to cause signal 49 to operate. This signal may be a light and/or a buzzer located near the driver's seat of the vehicle. Thus, a warning signal is given if the pressure of either of tires 11 or 12 drops below the predetermined level so that something can be done about it before either or both tires is damaged.

An important feature of this invention is that the unit 20 may be quickly and easily mounted on the hub cap 14 of wheel 10 without the necessity of removing the wheel or drilling any part of it or its brake drum 13. The casing 26 of operating wire 24 extends through one of the holes usually found in a wheel and is secured to the outer surface of the brake drum by welding or other means. Unit 20 being mounted on the hub cap is located at the centre of rotation of the wheel so that it does not throw the wheel out of balance and no counter-balancing is required. Another important feature of the invention is in the construction of block 60 and its associated elements. Bolt 62, locking pin 78, sleeves 105, springs 113 and their associated elements all fit nicely within bores formed in the block. Thus, these elements will withstand any vibration to which wheel 10 is subjected. The device is set into operation merely by cocking bolt 62. A visual inspection of the vehicle wheels will quickly indicate whether all the tires involved are inflated above the predetermined level since the bolt cannot be cocked if the pressure of a tire is below that level. In addition to this, each diaphragm 124 is protected against over-extension. If the pressure in a tire is very high, diaphragm 124 merely presses disc 118 against shoulder 120. On the other hand, if a spring 113 is under too great a pressure, sleeve 105 merely presses diaphragm 124 into the adjacent indentation 130 of plug 128.

What we claim as our invention is:

1. In apparatus for signalling pressure drops in pneumatic tires, a block, a bolt slidably mounted in the block, means urging the bolt towards an operating position, an operating wire connected to the bolt and movable thereby to operate signal means, a locking pin adapted removably to engage and retain a bolt in a cocked position out of said operating position, a handle connected to the bolt by means of which the latter can be moved to the cocked position, latch means engaging the locking pin normally retaining said pin out of engagement with the bolt, tube means having an end connected to said latch means and an opposite end adapted to be connected to a valve stem of a pneumatic tire to apply the air pressure of the tire to the latch means, said latch means when the tire pressure is above a predetermined level allowing the locking pin to engage the bolt and to retain said bolt in the cocked position after it has been moved into said cocked position, and moving the locking pin to free the bolt when the air pressure drops below said predetermined level to permit the bolt to return from the cocked position to its operating position.

2. Apparatus as claimed in claim 1 including a shoulder on the bolt engageable by the locking pin when the bolt is in its cocked position.

3. Apparatus as claimed in claim 2 in which the locking pin extends substantially normal to the bolt near the shoulder thereof, and including means normally biasing the locking pin into engagement with the bolt shoulder.

4. Apparatus as claimed in claim 1 in which the latch means includes a latch finger adapted to engage the locking pin, resilient means normally positioning the latch finger to keep the locking pin out of engagement with the bolt, and pneumatically operated means connected to said tube means opposing said resilient means and operated by the tire air pressure when said pressure is above the predetermined level to move the latch finger and permit the locking pin to engage the bolt.

5. In apparatus for signalling pressure drops in pneumatic tires, a block, a bolt slidably mounted in the block, means urging the bolt towards an operating position, a handle connected to the bolt by means of which the latter can be moved away from said operating position to a cocked position, stop means on the bolt, an operating wire connected to the bolt and movable thereby to operate signal means, a locking pin movably mounted in the block adjacent the bolt and positioned removably to engage said stop means when said bolt is in the cocked position to retain the bolt in said cocked position, latch means engaging the locking pin normally retaining said pin out of engagement with the bolt stop means, two tubes having ends connected to the latch means and opposite ends adapted to be connected to valve stems of different pneumatic tires of a dual tire set to apply the air pressure of said tires to the latch means, said latch means when the pressure of both tires is above a predetermined level allowing the locking pin to engage the bolt stop means and to retain said bolt in the cocked position after it has been moved into said cocked position, and moving the locking pin to free the bolt stop means when the air pressure in either tire drops below said predetermined level to permit the bolt to return from the cocked position to the operating position.

6. Apparatus as claimed in claim 5 in which the latch means includes two latch fingers adapted to engage the locking pin, two separate resilient means normally positioning the latch fingers respectively to keep the locking pin out of engagement with the bolt stop means, and separate pneumatically operated means connected to said tube of a different tire opposing each resilient means and operated by the air pressure of the latter tire when said pressure is above the predetermined level to move a latch finger to permit the locking pin to engage the bolt stop means.

7. Apparatus as claimed in claim 5 in which the latch means includes two latch fingers adapted to engage the locking pin, two plunger rods slidably mounted in the block, a transfer pin connecting each latch finger to a rod, separate spring means normally moving each plunger rod to position the latch fingers to keep the locking pin out of engagement with the bolt stop means, and separate pneumatic means for each rod connected to said tube of a different tire and actuated by the air pressure of the latter tire when said pressure is above the predetermined level to move said each rod against the spring means thereof and thereby move a latch finger to permit the locking pin to engage the bolt stop means.

8. Apparatus as claimed in claim 5 in which the latch means includes two latch fingers adapted to engage the locking pin, two plunger rods slidably mounted in the block, a transfer pin connecting each latch finger to one of the rods, separate spring means normally moving each plunger rod to position the latch fingers to keep the locking pin out of engagement with the bolt stop means, a diaphragm between an end of each plunger rod and said tube of a different tire when said pressure is above the predetermined level to move said rod against the spring means thereof and thereby move a latch finger to permit the locking pin to engage the bolt stop means.

9. Apparatus as claimed in claim 8 including means for limiting the movement of each diaphragm both when the operating rod is moved by its spring means against the diaphragm and by the pressure of the tire air.

10. In apparatus for signalling pressure drops in pneumatic tires, comprising a block, a bolt slidably mounted in the block resiliently loaded to an operating position, an operating wire connected to an end of the bolt and movable thereby to operate signal means, a handle connected to an opposite end of the bolt by means of which the bolt can be cocked against the resilient load thereof, a locking pin in the block and extending towards the bolt, biasing means to move an end of the locking pin into sliding engagement with the bolt, a shoulder on the bolt engageable by the locking pin when the bolt is cocked and out of its operating position, latch means engaging the locking pin normally maintaining said pin clear of the bolt and the shoulder thereon, tube means having an end connected to said latch means and an opposite end adapted to be connected to a valve stem of a pneumatic tire to apply the air pressure of the tire to the latch means, said latch means when the tire pressure is above a predetermined level allowing the locking pin to engage the bolt and thereby engage the bolt shoulder when the bolt is cocked, and moving the locking pin away from the bolt and shoulder when the air pressure drops below said predetermined level to permit the bolt to return from the cocked position to its operating position.

11. Apparatus for signalling pressure drops in pneumatic tires, comprising in combination a switch mounted on a stationary part of a vehicle near a wheel thereof, said switch being adapted to be included in a circuit of electrically-operated signal means in the vehicle, a block mounted on said wheel, a bolt slidably mounted in the block, means urging the bolt towards an operating position, an operating wire connected to the bolt and movable thereby, said wire extending to a position where it can operate said switch during rotation of the wheel and when the bolt is in the operating position, a handle connected to the bolt by means of which the latter can be moved away from said operating position to a cocked position, stop means on the bolt, a locking pin movably mounted in the block adjacent the bolt and positioned removably to engage said stop means when said bolt is in the cocked position to retain the bolt in said cocked position, latch means engaging the locking pin normally retaining said pin out of engagement with the bolt stop means, tube means having an end connected to said latch means, and an opposite end connected to a valve stem of a pneumatic tire on said wheel to apply the air pressure of the tire to the latch means, said latch means when the tire pressure is above a predetermined level allowing the locking pin to engage the bolt stop means and to retain said bolt in the cocked position after it has been moved into said cocked position, and moving the locking pin to free the bolt stop means when the air pressure drops below said predetermined level to permit the bolt to return from the cocked position to its operating position and thereby cause the wire to operate said switch and consequently the signal means.

12. Apparatus for signalling pressure drops in pneumatic tires, comprising in combination a switch mounted on a stationary part of a vehicle near a dual wheel thereof, said switch being included in the circuit of electrically-operated signal means in the vehicle, a block mounted on said wheel, a bolt slidably mounted in the block, means urging the bolt towards an operating position, an operating wire connected to the bolt and movable thereby, said wire extending to a position where it can operate said switch during rotation of the wheel and when the bolt is in the operating position, a handle connected to the bolt by means of which the latter can be moved away from said operating position to a cocked position, stop means on the bolt, a locking pin movably mounted in the block adjacent the bolt and positioned removably to engage said stop means when said bolt is in the cocked position to retain the bolt in said cocked position, latch means engaging the locking pin normally retaining said pin out of engagement with the bolt stop means, two tube means having ends connected to said latch means and opposite ends connected to valve stems of different pneumatic tires on said dual wheels to apply the air pressure of said tires to the latch means, said latch means when the pressure of both tires is above a predetermined level allowing the locking pin to engage the bolt stop means and to retain said bolt in the cocked position after it has been moved into said cocked position, and moving the locking pin to free the bolt stop means when the air pressure in either tire drops below said predetermined level to permit the bolt to return from the cocked position to the operating position and thereby cause the wire to operate said switch and consequently the signal means.

13. Apparatus as claimed in claim 11 in which the latch means includes two latch fingers adapted to engage the locking pin, two separate resilient means normally positioning the latch fingers respectively to keep the locking pin out of engagement with the bolt stop means, and separate pneumatically operated means connected to said tube of a different tire opposing each resilient means and operated by the air pressure of the latter tire when said pressure is above the predetermined level to move a latch finger to permit the locking pin to engage the bolt stop means.

14. Apparatus as claimed in claim 11 in which the latch means includes two latch fingers adapted to engage the locking pin, two plunger rods slidably mounted in the block, a transfer pin connecting each latch finger to a rod, separate spring means normally moving each plunger rod to position the latch fingers to keep the locking pin out of engagement with the bolt stop means, and separate pneumatic means for each rod connected to said tube of a different tire and actuated by the air pressure of the latter tire when said pressure is above the predetermined level to move said each rod against the spring means thereof and thereby move a latch finger to permit the locking pin to engage the bolt stop means.

15. Apparatus as claimed in claim 11 in which the latch means includes two latch fingers adapted to engage the locking pin, two plunger rods slidably mounted in the block, a transfer pin connecting each latch finger to one of the rods, separate spring means normally moving each plunger rod to position the latch fingers to keep the locking pin out of engagement with the bolt stop means, a diaphragm between an end of each plunger rod and said tube of a different tire when said pressure is above the predetermined level to move said rod against the spring means thereof and thereby move a latch finger to permit the locking pin to engage the bolt latch means.

References Cited by the Examiner
UNITED STATES PATENTS
2,314,965   3/1943   Sautu _____ 200—61 X
2,752,786   7/1956   Trinca.

BERNARD A. GILHEANY, *Primary Examiner.*

ROBERT K. SCHAEFER, *Examiner.*